(No Model.) 3 Sheets—Sheet 1.
M. A. PENNEY.
Wire Barbing Machine.
No. 236,453. Patented Jan. 11, 1881.
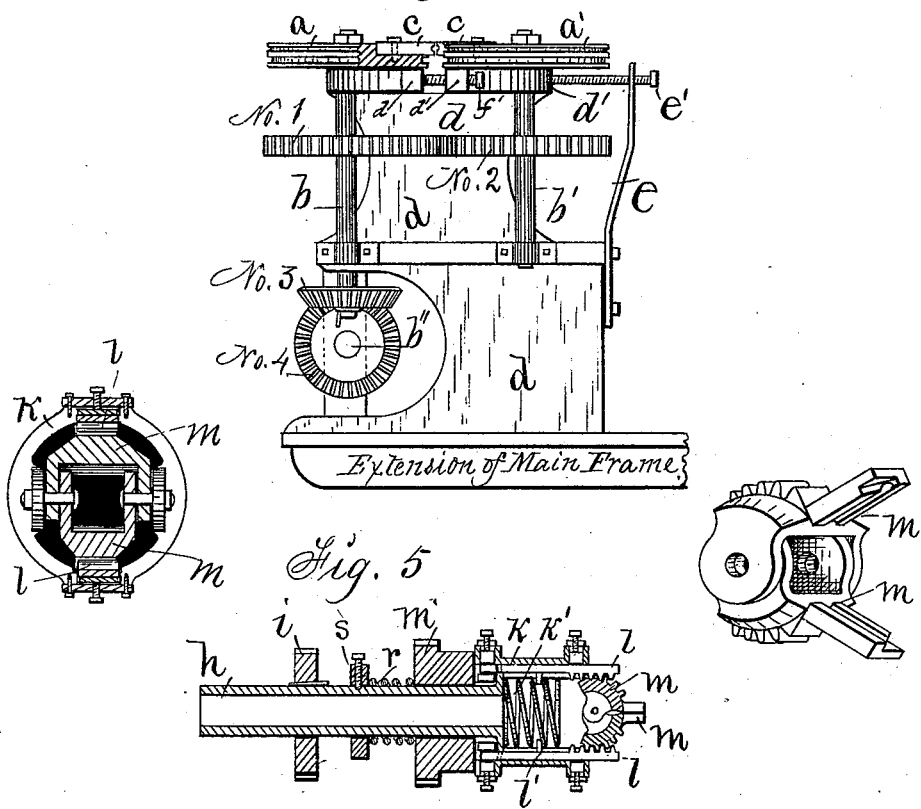

(No Model.) 3 Sheets—Sheet 2.

M. A. PENNEY.
Wire Barbing Machine.

No. 236,453. Patented Jan. 11, 1881.

Witnesses:
Frank W. Heers.
R. G. Orwig.

Inventor:
Mark A. Penney,
By Thomas G. Orwig,
Attorney.

(No Model.) 3 Sheets—Sheet 3.

M. A. PENNEY.
Wire Barbing Machine.

No. 236,453. Patented Jan. 11, 1881.

Witnesses:
P. C. Kenyon,
Frank W. Heers.

Inventor:
Mark A. Penney,
By Thomas G. Orwig, Atty.

UNITED STATES PATENT OFFICE.

MARK A. PENNEY, OF DES MOINES, IOWA.

WIRE-BARBING MACHINE.

SPECIFICATION forming part of Letters Patent No. 236,453, dated January 11, 1881.

Application filed August 10, 1880. (No model.)

*To all whom it may concern:*

Be it known that I, MARK A. PENNEY, of Des Moines, in the county of Polk and State of Iowa, have invented Improved Mechanism for Wire-Barbing Machines, of which the following is a specification.

My invention relates to that class of machines in which wire barb-pieces are cut from continuous wires at regular intervals and then wrapped upon fence wires or cables to form fixed barbs thereon at regular intervals of space.

Heretofore various devices have been used for feeding the barb-wire to the barb-cutting mechanism and barb-forming mechanism of a machine at regular intervals by means of vibrating toothed sectors and mutilated gear-wheels, that produced the necessary intermittent feed motions. Rotating shafts carrying devices of various kinds for wrapping the barb-pieces upon the fence-wire have also been actuated at intervals by the intermittent motions of pinions operated by racks and mutilated gear-wheels. Such intermittent motions of shafts, pinions, racks, toothed sectors, and mutilated gear-wheels are objectionable in a wire-barbing machine, because of the jarring, friction, wear, and strain they occasion; and my object is to feed the barb-wire to the cutting mechanism, and to wrap the barb-pieces upon the fence-wire, at regular intervals of time and space, by mechanism constructed as hereinafter set forth, in such a manner that all the rotating parts will have a continuous uninterrupted motion, that will accomplish the results contemplated without jarring and with less power and greater speed than any machine heretofore known and used.

Figure 3:
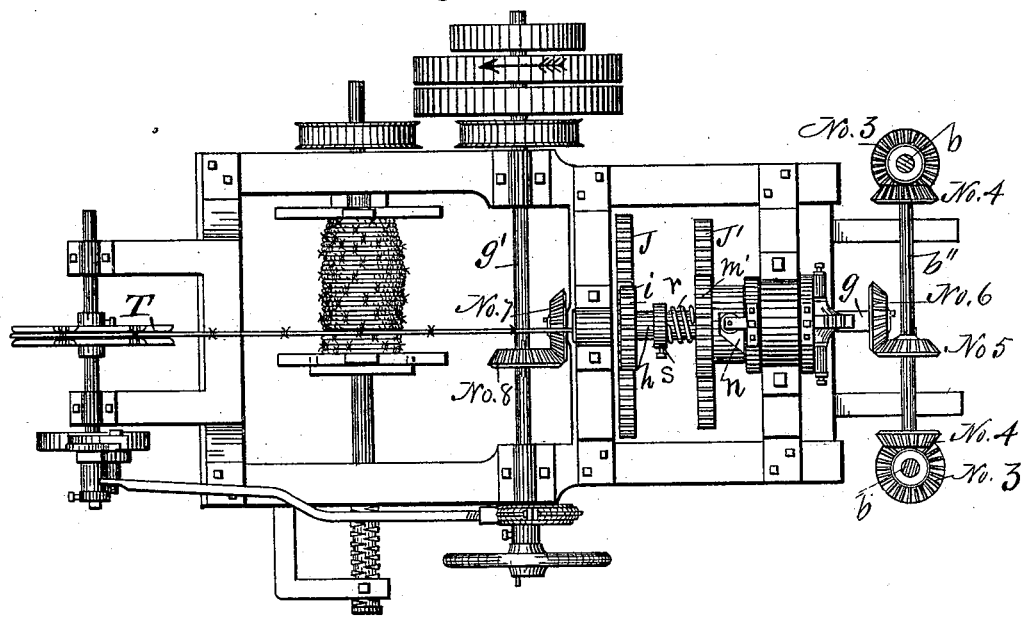
Figure 4:
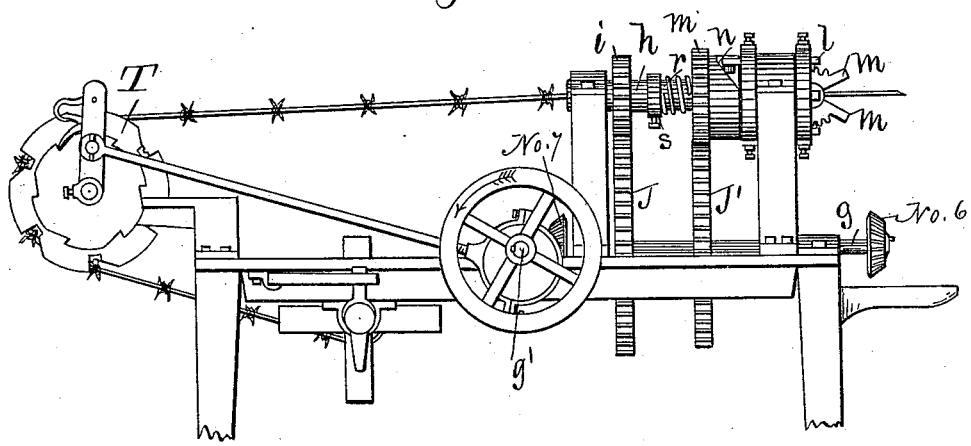
Figure 8:
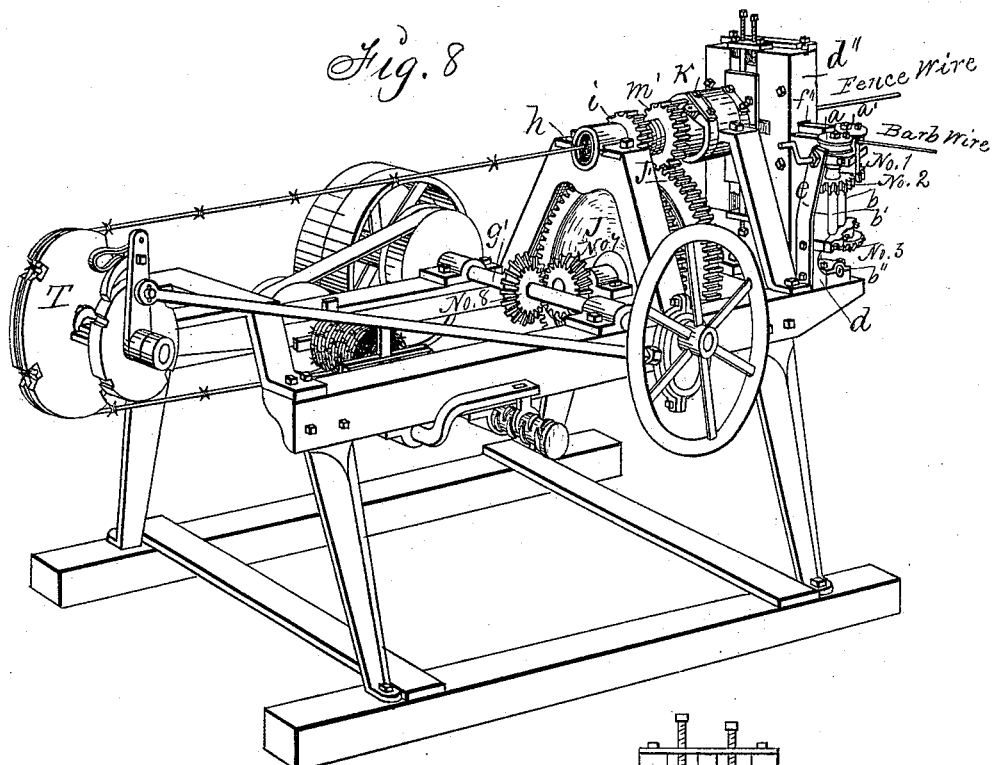
Figure 10:
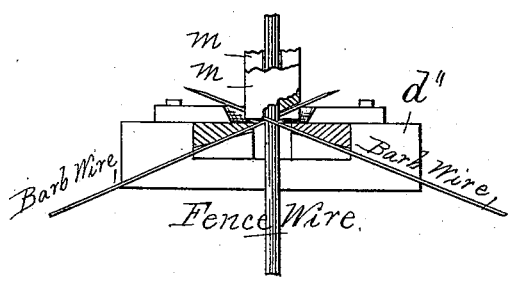
Figure 9:
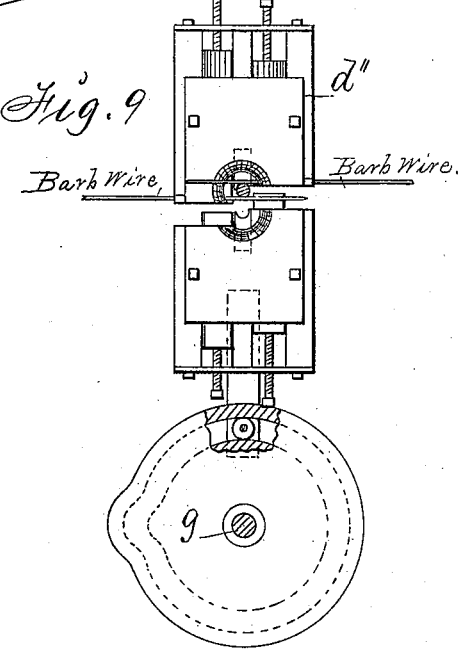

Figure 1 of my accompanying drawings (three sheets) is a top view of my wire-feeding mechanism. Fig. 2 is a side view of the same, taken from a point of view in direct line with the direction that the wire is moved. Fig. 3 is a top view of my machine, in which the wire-cutting mechanism and the wire-feeding mechanism is removed to uncover the bevel-gearing that imparts motion to the wire-feeding devices. Fig. 4 is a side view of the machine. Fig. 5 is a longitudinal half-section of my rotating barb-forming or barb-wrapping device, jointly considered. Fig. 6 is an enlarged sectional view taken through the line *x x* of Fig. 5, to show the manner in which the jaws are pivoted to ears projecting forward from the tubular head of the rotating shaft of my barb-wrapping mechanism. Fig. 7 is a perspective view of the jaws. Fig. 8 is a perspective view of my improved machine. Fig. 9 is a detail view of the barb-cutting mechanism. Fig. 10 is a detail view, showing the relative positions of the barb-cutters and the jaws that receive the barb-pieces and twist them around a fence-wire. These figures clearly illustrate the construction and operation of my improved devices.

$a$ and $a'$ represent a pair of cast-iron feed-rollers fixed to the top ends of vertical shafts $b$ and $b'$. These rollers are uniform in size, and each has a steel plate, $c$, fixed in its top surface in such a manner that the curved edge of each plate and segment will be in concentric position with the periphery of the roller upon which it is carried, and will extend a little beyond the roller to gripe the barb-wire and move it relative to the barb-cutting and barb-wrapping mechanism at each revolution of the mating feed-rollers $a$ and $a'$, and as required to cut and form barbs at regular intervals. The shafts $b$ (one is required in each feed device on each side of the machine) are mounted in bearings formed in or fixed to an auxiliary movable frame, $d$, that is readily connected with the main frame of the machine. Two of these auxiliary frames, $d$, each preferably cast complete in one piece, are so shaped that they will fit against the front end of the main frame, and against the opposite sides of the frame of the cutting mechanism, and will rest upon brackets or arms extending from the main frame, whereby they can be readily secured in fixed positions by means of bolts, as required, to support the wire-feeding mechanism. The frame $d''$ (shown in Figs. 8, 9, and 10) is fixed between the two frames $d$ by means of bolts, as required, to support the barb-cutting mechanism, which consists simply of plain steel bars that have cutting-edges, and are mounted in suitable bearings in such a manner and in such position relative to the wire-feeding mechanism that rectilinear motions are imparted thereto at regular intervals by means of a cam-wheel on the driving-shaft $g$, as shown in Fig. 9. The upper ends of the shafts $b'$ are mounted in bearings $d'$, that are hinged to the frame $d$, and the lower ends of the same shafts $b'$ are mounted in bearings formed in or attached to the frame $d$ in such a manner that the upper ends will be allowed to move laterally with the hinged frame $d'$ about one-sixteenth ($\frac{1}{16}$) part of an inch, as required, to adjust the feed-roller $a'$ relative to the roller $a$. Nos. 1 and 2 are mating gear-wheels fixed on the shafts $b$ and $b'$.

$e\,e$ are strong springs fixed to the auxiliary frames $d$ in such position relative to the hinged shaft-bearers $d'$ that they will, by means of set-screws $e'$ in their top ends, press the hinged shaft-bearers $d'$, and the shafts $b'$, and the feed-rollers $a'$, carried by the hinged bearers, toward the shafts $b$ and their feed-rollers $a$, as required to engage the barb-wires that are to be moved at regular intervals. This spring-pressure can be regulated by means of the screws $e'$, that extend through the top of the spring inward and against the hinged bearers $d'$.

$f\,f$ are tension devices placed between the ends of the hinged bearers $d'$ and the corresponding portions of the frame $d$, and regulated by means of set-screws $f'$. They consist of two small blocks that have grooves on their inside faces, in which the barb-wire moves. The friction of the wire passing between these blocks is readily regulated by means of the set-screws $f'$, that move the hinged bearers $d'$ relative to the blocks.

$f''$ are wire-guiding devices in the form of mating blocks or bars, fitted to the frames $d$ in such a manner that they will extend from the feed-rollers to the barb-cutting mechanism.

Nos. 3 are bevel-gear wheels on the lower portion of the vertical shafts $b$. They mesh with corresponding wheels, No. 4, that are fixed on the ends of a horizontal shaft, $b''$, as shown in Fig. 3. No. 5 is a bevel-gear wheel fixed on the same shaft $b''$, in such position relative to a corresponding wheel, No 6, on the end of a driving-shaft, $g$, that it will mesh therewith, as required, for the purpose of transmitting a continuous rotary motion to my wire-feeding mechanism.

No. 7 is a bevel-gear wheel on the opposite end of the same shaft, $g$, to which the wheel No. 6 is fixed.

$g'$ is the main driving-shaft. A bevel-gear wheel, No. 8, fixed thereon engages the wheel No. 7, and transmits power and motion from the main shaft to the minor shaft $g$, that extends therefrom at right angles, to transmit power and motion to the wire-feeding, barb-cutting, and barb-forming mechanisms.

$h$ (shown in Figs. 4 and 5) is a tubular shaft mounted immediately over the shaft $g$. It has a fixed pinion, $i$, that engages a gear-wheel, $J$, on the shaft $g$, by means of which it is rotated.

$k$ is a tubular head formed on the front end of the tubular shaft $h$. The diameter of its bore is larger than the bore of the shaft, and an annular shoulder is consequently formed at the junction of the two.

$k'$ is a coiled spring fitted in the chamber or bore of the tubular head $k$ and engages its annular shoulder.

$l\,l$ are sliding rack-bars fitted in grooves formed in the sides of the tubular head. Each rack-bar has a stud or pin, $l'$, projecting inward to engage the coiled spring $k'$, which spring, in its normal condition, keeps the rack-bars in position as required, to hold open a pair of jaws.

$m\,m$ are the barb-wrapping jaws, that carry the ends of the wire barb-pieces around the fence-wire before the barbs are severed from the barb-wires. They are formed and pivoted in the inside and front open end of the head $k$ in such a manner that they can be operated, like a toothed sector, by means of the rack-bars $l$. A forward movement of the parallel rack-bars closes the jaws, and a rearward motion of the same rack-bars opens the jaws.

$m'$ is a loose pinion on the tubular shaft $k$. It is larger than the pinion $i$ on the same shaft, and engages a gear-wheel, $J'$, on the shaft $g$, by means of which it is rotated at a slower speed than the tubular shaft $h$, as required, to operate the rack-bars and jaws carried by the said shaft at regular intervals. Two cams, $n$, in the hub of the loose pinion $m'$ (one of which is shown in Fig. 3) impart a rectilinear motion to the rack-bars $l$, as required, to close the jaws $m$ when they engage a barb-piece and wrap it upon the fence-wire.

$r$ is a coiled spring surrounding the shaft $h$. It is pressed against the side of the loose pinion $m'$ by means of a collar, $s$, that is locked on the same shaft by means of a set-screw. Its function is to provide elasticity to the cams $n$ in the hub of the pinion $m'$, as required, to operate the rack-bars $l'$ and jaws $m$ without undue friction and straining.

T (shown in Figs. 3, 4, and 8) represents a wire-moving and barb-spacing device mounted at the rear end of the machine, and combined with the driving-shaft $g'$ in such a manner that motion can be imparted thereto at regular intervals, as required, to move the fence-wire through the machine to be barbed and coiled upon a spool.

I claim as my invention—

1. In a wire-barbing machine, the feed-rollers $a$ and $a'$, each having an adjustable and removable segment, $c$, the rotating shaft $b$ in fixed bearings, and the rotating shaft $b'$ in a hinged bearing, arranged and combined substantially as shown and described, to operate in the manner set forth, for the purposes specified.

2. The feeding mechanism for wire-barbing machines, composed of the following elements, to wit: a rotating shaft, $b$, mounted in fixed bearings and having a pinion, No. 1, and a feed-roller, $a\,c$, a shaft, $b'$, mounted in a hinged bearing and having a pinion, No. 2, and a feed-roller, $a'\,c$, a spring, $e$, carrying a set-screw, $e'$, a tension device, $f\ f$, and a wire-guiding device, $f'\ f'$, substantially as shown and described, for the purposes specified.

3. The barb-forming mechanism for wire-barbing machines, composed of the following elements, to wit: the tubular rotating shaft $h$, having a head, $k$, the spring $k'$, the rack-bars $l\ l'$, the jaws $m$, the pinion $m'$, having cams $n$ in its hub, the spring $r$, and collar $s$, substantially as shown and described, to operate in the manner set forth, for the purposes specified.

MARK A. PENNEY.

Witnesses:
FRANK W. HEERS,
ERASTUS W. SMITH.